(12) United States Patent
Petkov et al.

(10) Patent No.: US 10,956,187 B2
(45) Date of Patent: Mar. 23, 2021

(54) METHOD AND SYSTEM FOR ENHANCING VIRTUALIZED INFRASTRUCTURE AT CUSTOMER'S PREMISE WITH CLOUD ANALYTICS

(71) Applicant: VMware, Inc., Palo Alto, CA (US)

(72) Inventors: Aleksandar Petkov, Sofia (BG); Teodor Parvanov, Sofia (BG); Anton Petrov, Sofia (BG); Tanya Hristova, Sofia (BG); Miroslav Shtarbev, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 88 days.

(21) Appl. No.: 16/254,564

(22) Filed: Jan. 22, 2019

(65) Prior Publication Data
US 2020/0233685 A1  Jul. 23, 2020

(51) Int. Cl.
| | | |
|---|---|---|
| G06F 9/455 | (2018.01) | |
| G06F 21/62 | (2013.01) | |
| H04L 12/24 | (2006.01) | |
| H04L 29/08 | (2006.01) | |
| G06F 11/34 | (2006.01) | |

(52) U.S. Cl.
CPC ...... *G06F 9/45541* (2013.01); *G06F 11/3409* (2013.01); *G06F 21/6254* (2013.01); *H04L 41/0816* (2013.01); *H04L 41/14* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 9,633,024 | B2* | 4/2017 | Demilo | G06F 16/122 |
| 9,740,876 | B1* | 8/2017 | Nachenberg | G06F 21/6218 |
| 9,871,851 | B2* | 1/2018 | Todd | H04L 67/10 |
| 10,135,705 | B2* | 11/2018 | Asenjo | H04L 41/5032 |
| 2014/0149494 | A1* | 5/2014 | Markley | H04W 4/60 709/203 |
| 2016/0080203 | A1* | 3/2016 | Narasimhan | H04L 67/28 709/221 |

(Continued)

OTHER PUBLICATIONS

"Customer Experience Improvement Program", VMware, Retrieved on Jan. 22, 2019 from the Internet at <URL: vmware.com/solutions/trustvmware/ceip.html>.

(Continued)

*Primary Examiner* — Abu Zar Ghaffari
(74) *Attorney, Agent, or Firm* — Su IP Consulting (57) ABSTRACT

A method is provided to enhance a virtualized infrastructure at a customer's premise with a cloud analytics service. The method includes receive a request for an expert use case on an expertise about an object in the virtualized infrastructure and performing an expertise cycle on the expert use case, which includes retrieving a manifest for the expert use case from a cloud analytics site remote from the customer's premise, collecting the telemetry data from the virtualized infrastructure based on the manifest, uploading the collected telemetry data to the cloud analytics site, and retrieving an expertise result for the expert use case from the cloud analytics site. The method further includes communicating the expertise result about the object to the customer and changing a configuration of the object.

22 Claims, 5 Drawing Sheets

(56) References Cited

U.S. PATENT DOCUMENTS

| | | | | |
|---|---|---|---|---|
| 2016/0110972 | A1* | 4/2016 | Renkis | G08B 13/19656 |
| | | | | 709/205 |
| 2017/0272485 | A1* | 9/2017 | Gordon | H04L 65/601 |
| 2017/0353516 | A1* | 12/2017 | Gordon | H04L 67/10 |
| 2017/0372009 | A1* | 12/2017 | Sanyal | H04L 67/04 |
| 2018/0063244 | A1* | 3/2018 | Maturana | G06F 9/5072 |
| 2018/0285240 | A1* | 10/2018 | Kou | G06F 11/3644 |
| 2018/0373419 | A1* | 12/2018 | Chen | H04L 67/22 |
| 2019/0018394 | A1* | 1/2019 | Sayyarrodsari | G05B 19/41865 |
| 2019/0057011 | A1* | 2/2019 | Knowles | H04L 41/0645 |
| 2019/0087835 | A1* | 3/2019 | Schwed | G06Q 30/0201 |
| 2019/0206569 | A1* | 7/2019 | Shelton, IV | A61B 1/00016 |

OTHER PUBLICATIONS

"VSAN 6.6 Online Health Check and Performance Service Improvements", VMware, Retrieved on Jan. 22, 2019 from the Internet at <URL: blogs.vmware.com/virtualblocks/2017/04/20/vsan-6-6-online-health-check-performance-improvements/>.

Aparna Somaiah, "vSAN Online Health Check: New KBs now available", VMware Blogs, Posted on Feb. 21, 2018, Retrieved on Jan. 22, 2019 from the Internet at <URL: /blogs.vmware.com/virtualblocks/2018/02/21/vsan-online-health-checks-available/>.

* cited by examiner

METHOD AND SYSTEM FOR ENHANCING VIRTUALIZED INFRASTRUCTURE AT CUSTOMER'S PREMISE WITH CLOUD ANALYTICS

BACKGROUND

VMware offers products such as vRealize Operations and vRealize Log Insight that provide rich functionalities for virtualized infrastructure analytics. These products, however, are based on an on-premise deployment model and cannot be modified "on the fly" without a dedicated release. Additionally, the products deployed on-premise often have limited compute/storage resources for running analytics, whereas an analytics cloud has practically unlimited resources and choice of implementation technologies (deterministic/heuristic algorithms, rule-based, machine learning). An analytics cloud may also store vast amounts of data which can also potentially be used for providing expert insights.

VMware has an existing solution for scheduled telemetry collection. It relies on a remotely-controlled collector which actively queries and fetches data from a vSphere deployment. This is done according to a predetermined schedule and temporally-independent of any events happening in the environment. This makes it suitable for slow-changing configuration data but not for usage data. Usage data imposes the additional requirement that each vSphere component should have an application programming interface (API) for retrieving such data. This data then must be managed and persisted for each component, which (due to its impracticality and inefficiency) leads to usage data not being collected from most vSphere components. Another approach to telemetry delivery consists of telemetry producers calling and sending telemetry directly to the analytics cloud (point-to-point). This is inefficient and unmaintainable. In highly-controlled on-premise systems this is also undesirable, as it significantly drives up the number of outbound connections.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Enhancing Products with Cloud Analytics

One attempt at providing a more cloud-driven approach is vSAN Online Health Check. It includes a vSphere user interface (UI) plugin, an on-premise service, and an expert application running on VMware's Analytics Cloud (VAC). The on-premise service retrieves a document called "data collection manifest" or "telemetry manifest" from the VAC, collects data according to the manifest, sends the data to the expert application on the VAC for analysis, and then displays the health result in the UI.

The preset disclosure improves over the existing method by providing an extensible platform that is part of the on-premise virtualization product (e.g., vSphere). The platform can serve any number of cloud-driven expert use cases each providing an expertise "E" on a virtual object "X" in a virtualized infrastructure created with the virtualization product. Expertise E may include performance tuning, capacity planning, topology validation, infrastructure health analysis, and upgrade scenario validation, and virtual object X may be a host, a cluster, a data store, or data center. Instead of being a specific virtual object, X may be a virtual object type.

The platform delivers new cloud-based analytics features for the virtualized infrastructure with minimum-to-no changes in the on-premise virtualization product, which shortens the time required for delivering new expert insights by orders of magnitude to customers (e.g., from months to days, even hours). In one example, an existing use case is enhanced by changing the logic of an existing expert application on the cloud. There is no need to wait for a product release window as the expert application is directly modified in the cloud and the new logic is directly delivered to the customer. In another example, a new use case with a new expert application is introduced by implementing a new UI plugin and developing a new expert application in the cloud. In both examples, the effort of adding new expert insights is minimal although a release cycle is required for the latter.

Figure 1:
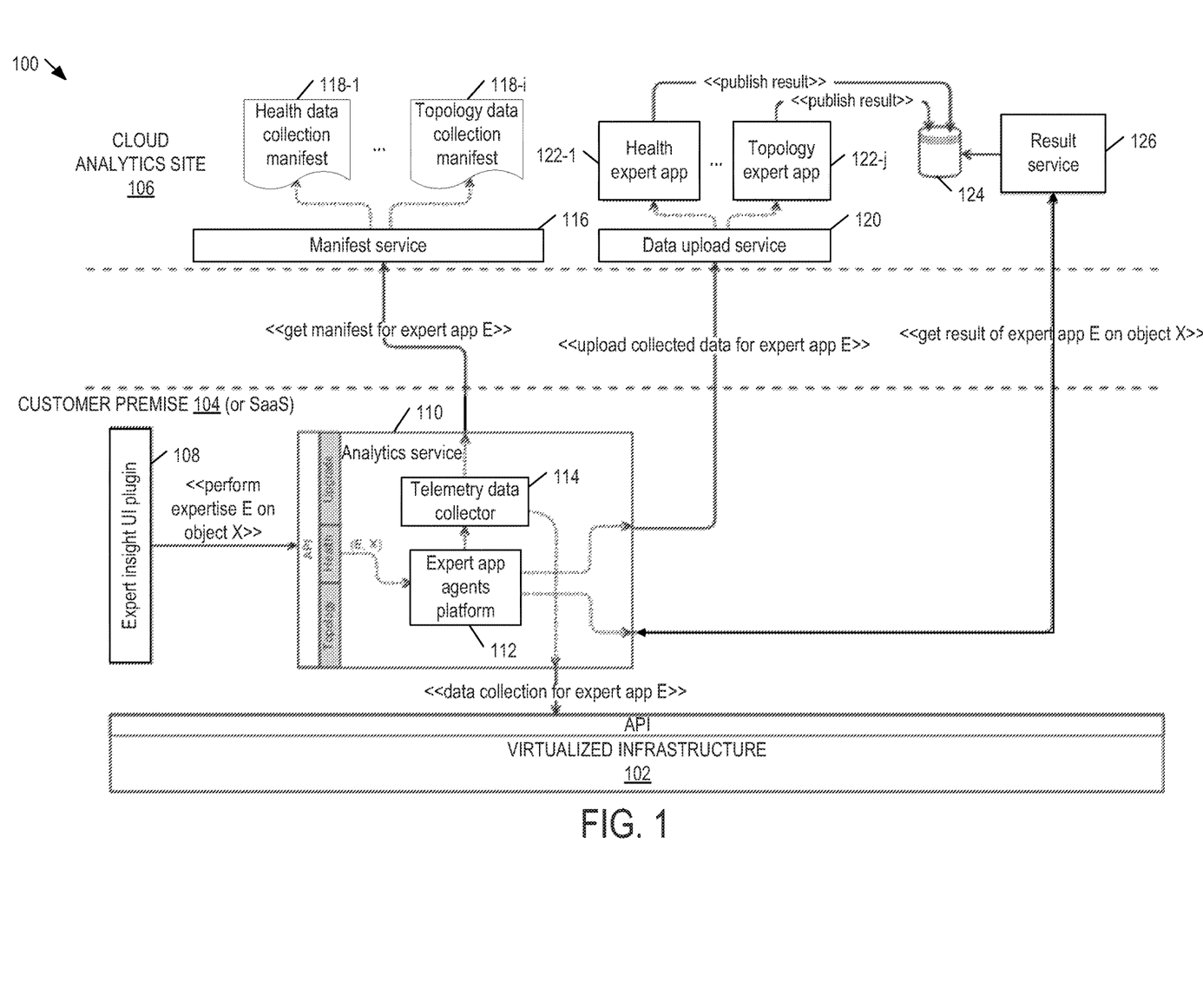
FIG. 1 is block diagram illustrating a system for providing cloud analytics to a customer's virtualized infrastructure in examples of the present disclosure.

FIG. 1 is block diagram illustrating a system 100 for providing cloud analytics to a customer's virtualized infrastructure 102 in examples of the present disclosure. System 100 consists of host computers running hypervisors (e.g., VMware ESXi hypervisors) that implement virtualized infrastructure 102, such as a software-defined data center. Virtualized infrastructure 102 includes virtual machines, software-defined (virtual) networking, and software-defined (virtual) storage. System 100 has components located on a customer premise 104 and components at a cloud analytics site 106 that is remote from the customer premise.

Components on customer premise 104 include an expert UI plugin 108 and an analytics service 110, both which may be part of a central management server (e.g., VMware vCenter server) for managing virtualized infrastructure 102. Analytics service 110 is made up of an expert application agents platform 112 and a manifest-driven telemetry data collector 114. Alternatively, in some examples of the present disclosure, virtualized infrastructure 102, expert UI plugin 108, and analytics service 110 are software-as-a-service (SaaS) products that is remote from customer premise 104 but may be remote or local with cloud analytics site 106.

Cloud analytics site 106 may be VAC or another any other analytics platform. Components of cloud analytics site 106 include a manifest service 116 for serving telemetry manifests 118-1 . . . 118-1 (collectively as "manifests 118" or individually as a generic "manifest 118"), a data upload service 120, expert applications 122-1 . . . 122-j (collectively as "expert applications 122" or individually as a generic "expert application 122"), a result database 124, and a result service 126.

Figure 2:
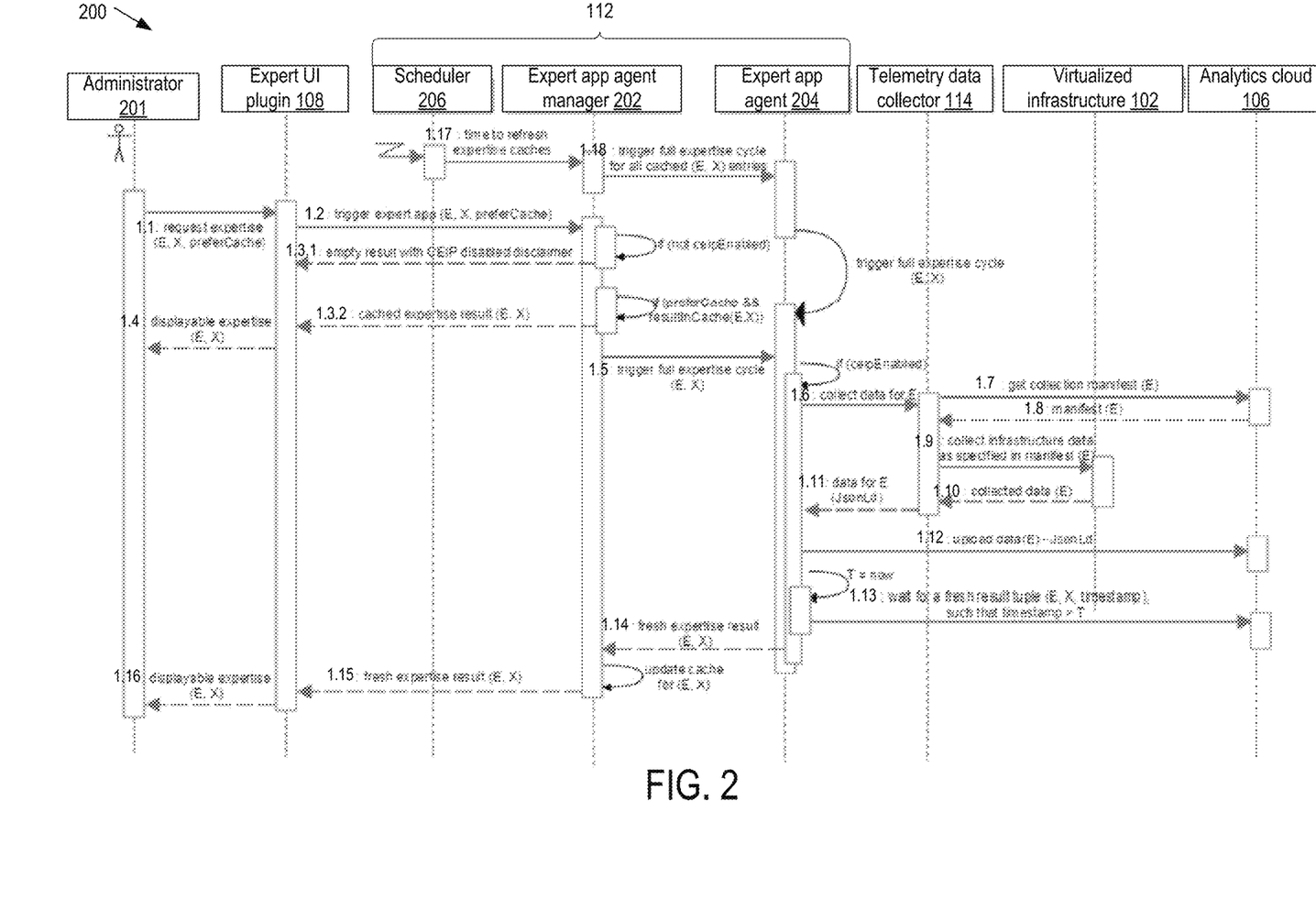
FIG. 2 is a block diagram illustrating a flowchart of a method for the system of FIG. 1 to enhance the virtualized infrastructure of FIG. 1 with a cloud analytics service in some examples of the present disclosure.

An administrator 201 (FIG. 2) uses expert UI plugin 108 to request an expert use case on an expertise E about a virtual object X in virtualized infrastructure 102. Expert UI plugin 108 passes the request to the expert application agents platform 112, which orchestrates the other components in the data collection and result building processes. As described later, the expert application agents platform 112 may include an expert application agents manager 202 (FIG. 2), an expert application agent 204 (FIG. 2), and a scheduler 206 (FIG. 2). Telemetry data collector 114 retrieves a manifest 118 from manifest service 116 and performs data collection from virtualized infrastructure 102. Manifest service 116 serves manifest 118 that, for a given expertise E, defines what type of (anonymized) data should be collected from virtualized infrastructure 102 (e.g. host drivers, networking settings, CPUs, datastore configurations). The expert application agents platform 112 uploads the collected data to data upload service 120, which forwards them to the expert application 122 for expertise E. Expert application 122 analyzes the collected data and stores a structured result in result database 124. Expert application 122 may be implemented as an imperative program (e.g., Python, Java), a neural net that identifies hard to spot failure patterns, a forward-chaining inference engine that provides deductive functionality, a backward-chaining inference engine that derives a root cause from a set of symptoms, a set of queries in historical telemetry data, or any combination thereof. Result service 126 returns the result for expertise E about object X to the expert application agents platform 112, which communicates the result via expert UI plugin 108 to administrator 201.

FIG. 2 is a block diagram illustrating a flowchart of a method 200 for system 100 (FIG. 1) to enhance virtualized infrastructure 102 at a customer premise with a cloud analytics service in some examples of the present disclosure. Method 200, and any method described herein, may be implemented as instructions encoded on a computer-readable medium that is to be executed by a processor in a computer system. Method 200, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 200 may begin in step 1.1.

In step 1.1, an administrator 201 of virtualized infrastructure 102 uses expert UI plugin 108 to request an expert use case on expertise E about virtual object X in virtualized infrastructure 102. Administrator 201 may also specify if a cached result of the last performed analysis on expertise E about virtual object X should be displayed while a new result is being prepared. Administrator 201 may wish to review the cached result while waiting for the new result as generating the new result may take some time. Step 1.1 may be followed by step 1.2.

In step 1.2, expert UI plugin 108 passes the request to the expert application agents manager 202. The request specifies expertise E and object X, and optionally if a cached result is to be displayed. In response to the request, the expert application agents manager 202 determines if the customer has agreed to share telemetry data from virtualized infrastructure 102 (e.g., by looking up a customer database). If no, step 1.2 may be followed by step 1.3.1. If the customer agrees to share telemetry data and wishes to view a cached result, step 1.2 may be followed by step 1.3.2. If the customer agrees to share telemetry data but does not wish to view a cached result, step 1.2 may be followed by step 1.5.

In step 1.3.1., the expert application agents manager 202 returns an empty result with a disclaimer that the customer has not agreed to share telemetry data to expert UI plugin 108, which displays or otherwise communicates the result to administrator 201. Step 1.3.1 may loop back to step 1.1 after administrator 201 agrees to share telemetry data.

In step 1.3.2, the expert application agents manager 202 returns the cached result of the expert use case on expertise E about virtual object X to expert UI plugin 108. Step 1.3.2 may be followed by step 1.4.

In step 1.4, expert UI plugin 108 displays or otherwise communicates the cached result of expertise E about virtual object X while the new result is being prepared. Step 1.4 may be followed by step 1.5.

In step 1.5, the expert application agents manager 202 triggers an expertise cycle on expertise E about virtual object X. For the very first expertise cycle on expertise E about virtual object X, the expert application agents manager 202 creates an instance of an expert application agent 204 and specifies expertise E and object X to the agent instance. After the instance of agent 204 has been created, the expert application agents manger 202 instructs the instance of agent 204 to run its expertise cycle for expertise E about virtual object X. Step 1.5 may be followed by step 1.6 where each instance of agent 204 carries out its expert cycle.

In step 1.6, the instance of agent 204 instructs telemetry data collector 114 to collect data for expertise E. Step 1.6 may be followed by step 1.7.

In step 1.7, telemetry data collector 114 retrieves a manifest 118 (FIG. 1) for expertise E from manifest service 116 at cloud analytics site 106. For example, telemetry data collector 114 requests for the manifest by specifying expertise E to manifest service 116. As previously described, a manifest defines telemetry data types to be collected for a given expertise E. Step 1.7 may be followed by step 1.8.

In step 1.8, manifest service 116 returns the proper manifest 118 for expertise E to telemetry data collector 114. Step 1.8 may be followed by step 1.9.

In step 1.9, telemetry data collector 114 collects telemetry data as specified in manifest 118 for expertise E. For example, telemetry data collector 114 uses a data service of virtualized infrastructure 102 to collect the telemetry data types defined in manifest 118. Step 1.9 may be followed by step 1.10.

In step 1.10, the data service of virtualized infrastructure 102 returns the collected data for expertise E to telemetry data collector 114. Step 1.10 may be followed by step 1.11.

In step 1.11, telemetry data collector 114 returns the collected data for expertise E to the instance of agent 204. For example, telemetry data collector 114 sends the collected data for expertise E in a file format such as JavaScript Object Notation for Linked Data (JDON-LD) to the instance of agent 204. Step 1.11 may be followed by step 1.12.

In step 1.12, the instance of agent 204 uploads the collected data for expertise E to data upload service 120 at cloud analytics site 106. To upload the collected data, the instance of agent 204 specifies expertise E to data upload service 120. As previously described, data upload service 120 forwards the collected data to the expert application 122 (FIG. 1) for expertise E at cloud analytics site 106. In some examples of the present disclosure, the instance of agent 204 anonymizes the collected data before transmitting them to data upload service 120 to protect the customer's confidential information. Step 1.12 may be followed by step. 1.13.

Alternatively, in some examples of the present disclosure, steps 1.11 and 1.12 are combined into a single step where telemetry data collector 114 directly uploads the collected data for expertise E to data upload service 120 at cloud analytics site 106. To upload the collected data, telemetry data collector 114 specifies expertise E to data upload service 120.

In step 1.13, the instance of agent 204 waits a period T for expert application 122 for expertise E to process the collected data. Expert application 122 generates fresh results for expertise E about all virtual objects related to expertise E, including the requested virtual object X, and stores the fresh results in result database 124. The instance of agent 204 then retrieves a fresh result from result service 126 at cloud analytics site 106 by specifying expertise E and virtual object X. The fresh result identifies expertise E, virtual object X, and a timestamp of when the result was generated. Alternatively, in some examples of the present disclosure, the instance of agent 204 retrieves the fresh results of expertise E about all virtual objects related to expertise E. Step 1.13 may be followed by step 1.14.

In step 1.14, the instance of agent 204 forwards the fresh result of expertise E about virtual object X to the expert application agents manager 202, which in turn updates the cached result for expertise E about virtual object X. Step 1.14 may be followed by step 1.15.

In step 1.15, the expert application agents manager 202 sends the fresh result of expertise E about object X to expert UI plugin 108. Step 1.15 may be followed by step 1.16.

In step 1.16, expert UI plugin 108 displays or otherwise communicates the fresh result of expertise E about virtual object X to administrator 201.

As previously described, generating a new result of expertise E about virtual object X may take some time. In some examples of the present disclosure, scheduler 206 periodically refreshes cached expertise results in the background to provide the latest cached results to administrator 201. In step 1.17, scheduler 206 determines it is time to refresh the cached expertise results and informs the expert application agents manager 202. Step 1.17 may be followed by step 1.18. In step 1.18, the expert application agents manager 202 triggers an expertise cycle for each cached expertise about a virtual object. The expert application agents manager 202 instructs each instance of agent 204 to run its expertise cycle. Step 1.18 may be followed by step 1.6 where each instance of agent 204 carries out its expert cycle.

Figure 3:
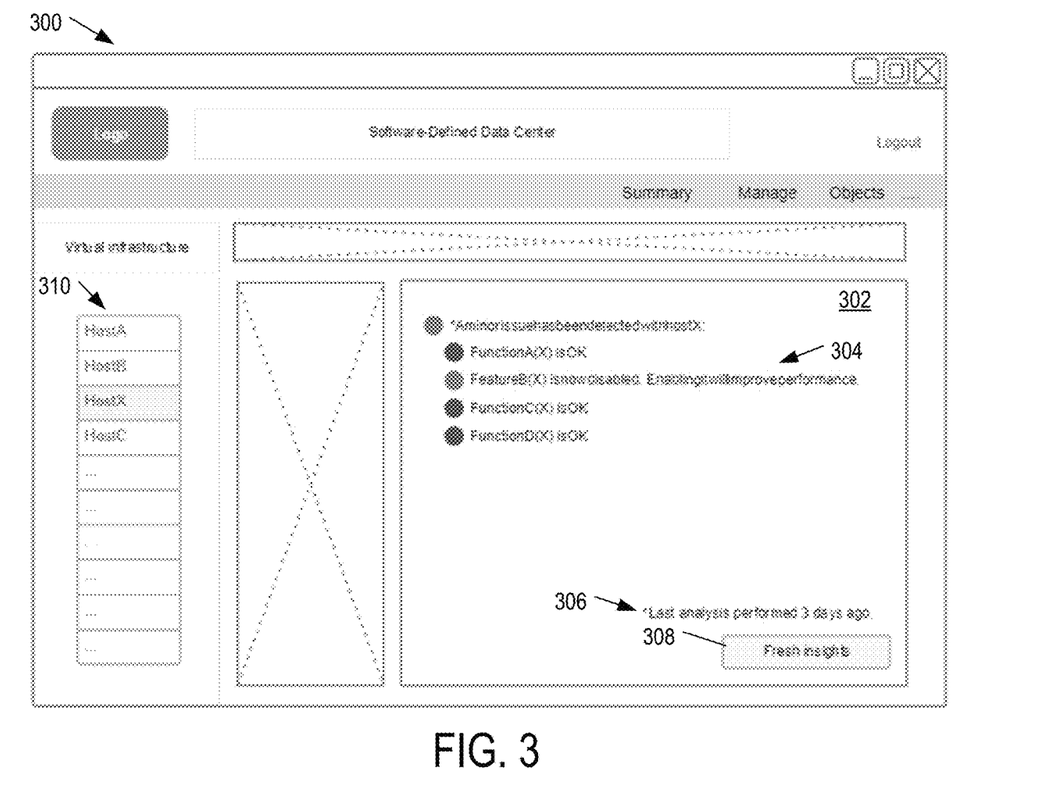
FIG. 3 is a block diagram illustrating a user interface (UI) generated by an expert UI plugin of FIGS. 1 and 2 in some examples of the present disclosure.

FIG. 3 is a block diagram illustrating a UI 300 generated by expert UI plugin 108 (FIGS. 1 and 2) after administrator 201 (FIG. 2) selects an expertise E, a virtual object X, and set a preference for viewing a cached result of expertise E about virtual object X in some examples of the present disclosure. Assume administrator 201 selects the expertise of virtualized infrastructure health analysis, the virtual object of host X, and the preference to view a cached result. UI 300 includes a cached result 302 of expertise E about virtual object X. Result 302 indicates the health of various features or components, as well as a recommendation 304 to change the configuration of host X, such as enabling a feature B for host X to improve performance. A disclaimer 306 indicates the cached result was generated 3 days ago. Administrator 201 may select a button 308 to generate a fresh result. Administrator 201 may also select another virtual object from a list 310 to apply the expertise.

In some examples, administrator 201 may click or otherwise select recommendation 304 to change the configuration of virtual object X. In response, expert UI plugin 108 sends a request to a central management server, such as VMware vCenter server, to implement the change to the configuration of virtual object X. Alternatively, expert application agents manager 202 (FIG. 2) may automatically send a request to change the configuration of virtual object X based on result 302.

Pre-Processing Telemetry Transmission Mechanism

As previously described, telemetry data collector 114 (FIG. 1) collects telemetry data from virtualized infrastructure 102. Collecting slow-changing, relatively stable telemetry data (e.g., configurations and states) facilitates support, fault investigation, and informed planning and decision-making. Collecting fast-changing and voluminous telemetry data (e.g., usage and diagnostic data) facilitates analysis of the ways products are used by customers, as well as provide real-time insights into the system's operations and preventively identify potential problems. Collecting usage and diagnostic data poses many challenges due to its scale, frequency, and remote location, including retries on failures, request batching, client-side buffering, and compression.

In some examples of the present disclosure, a telemetry transmission mechanism is provided to handle vast amounts of fast-changing usage and diagnostic data. The mechanism transfers the data efficiently and reliably to a cloud analytics site 106 (FIG. 1), such as VAC, where the data can be analyzed and utilized. The mechanism allows components in system 100 (FIG. 1) to send data based on events, failure modes, and usage.

The telemetry transmission mechanism supports event-based telemetry to handle frequent telemetry requests from many sources. It provides a single application programming interface (API) that hides much of the complexity involved in telemetry transmission and facilities easy product integration. The telemetry transmission mechanism can be used in on-premise and SaaS products alike, minimizing the number of outbound connections to cloud analytics site 106. It utilizes buffering and compression in order to optimize telemetry delivery. The telemetry transmission mechanism guarantees reliable delivery of telemetry to cloud analytics site 106. It brings minimal performance overhead of the integrated products. The telemetry transmission mechanism is controlled remotely, using a telemetry manifest specifying the desired behavior.

Figure 4:
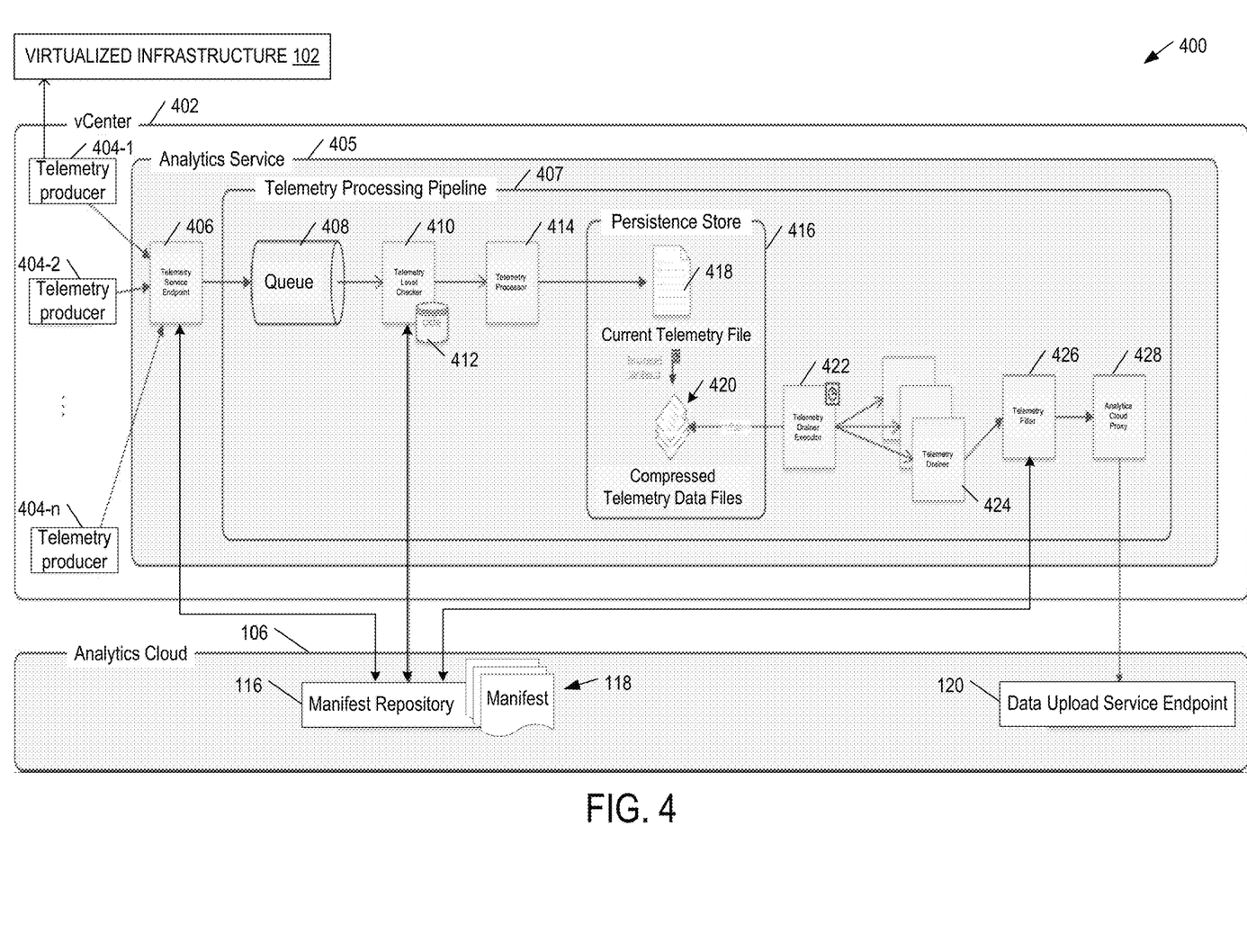
FIG. 4 is a block diagram illustrating a system for collecting telemetry data from a virtualized infrastructure of based on a telemetry manifest in examples of the present disclosure.

FIG. 4 is a block diagram illustrating a system 400 for collecting telemetry data from a virtualized infrastructure, such as virtualized infrastructure 102 (FIG. 1), based on a telemetry manifest in examples of the present disclosure. System 400 is an example or a variation of system 100 (FIG. 1) where the same or similar elements share the same reference numbers. System 400 includes virtualized infrastructure 102, cloud analytics site 106, and a central management server 402 (e.g., VMware vCenter server) for managing virtualized infrastructure 102.

Central management server 402 includes telemetry producers 404-1, 404-2 . . . 404-n (collectively "telemetry producers 404" or individually as a generic "telemetry producer 404") and an analytics service 405. Telemetry producers 404 denote on-premise and SaaS product components that regularly send telemetry data to cloud analytics site 106. A telemetry producer 404 may collect telemetry data from virtualized infrastructure 102 and send the collected data to analytics service 405 when a certain event occurs in virtualized infrastructure 102, such as detecting certain error or performance condition.

Analytics service 405 includes a telemetry service endpoint 406 and telemetry processing pipeline 407. Telemetry service endpoint 406 provides a single API for telemetry producers 404 to request telemetry services (e.g., expertise E about virtual object X) from cloud analytics site 106. Telemetry processing pipeline 407 includes a queue 408 for telemetry service requests, a telemetry level checker 410 with a cache 412 of manifests 118 (FIG. 1), a telemetry processor 414, a persistence store 416 of a telemetry log file 418 for each telemetry producer 404 and a queue 420 for compressed telemetry files, a telemetry drainer executor 422, instances of telemetry drainer 424, a telemetry filter 426, and an analytics cloud proxy 428.

Figure 5:
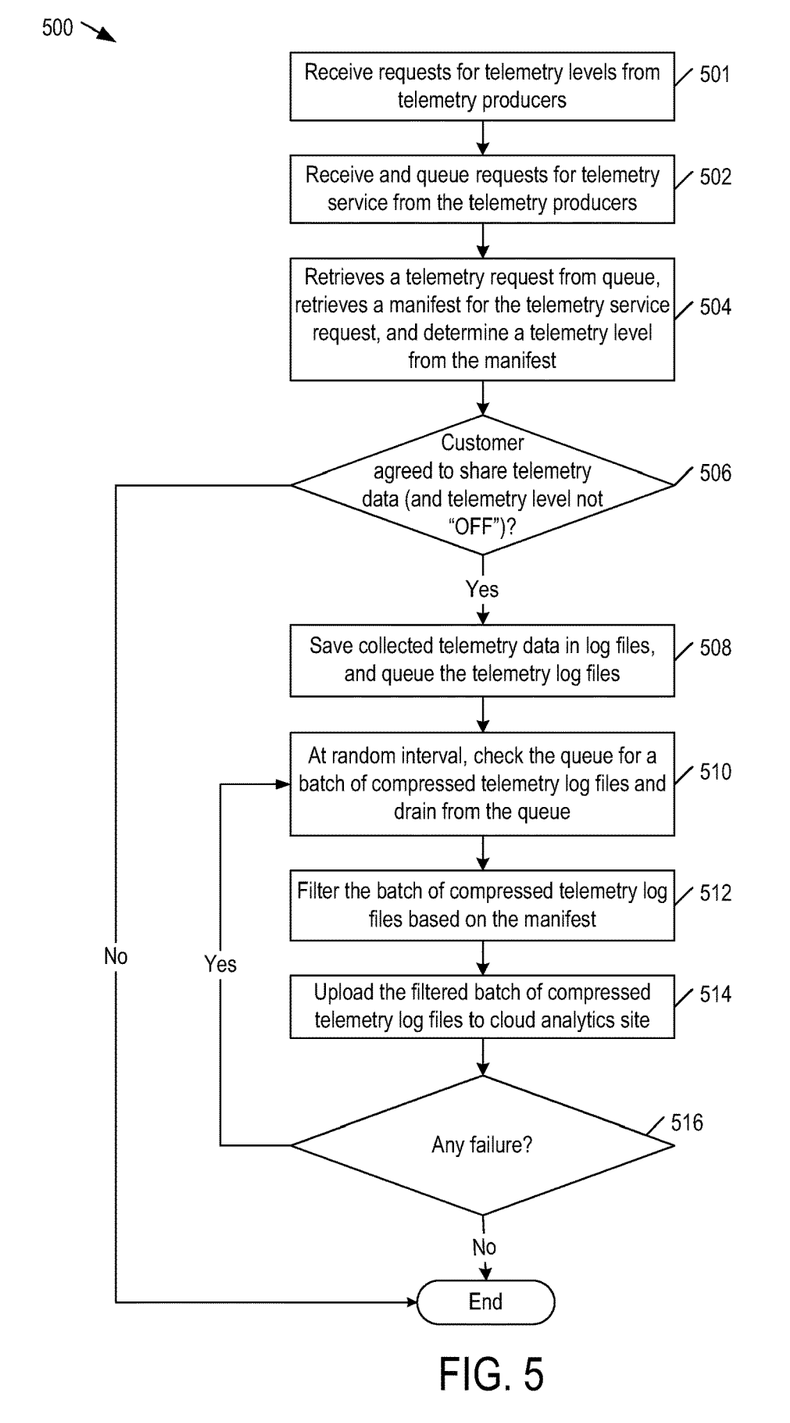
FIG. 5 is a block diagram illustrating a method for an analytic service of FIG. 4 to collect telemetry data from the virtualized infrastructure of FIG. 4 in some examples of the present disclosure.

FIG. 5 is a block diagram illustrating a method 500 for analytics service 405 (FIG. 4) to collect telemetry data from virtualized infrastructure 102 in some examples of the present disclosure. Method 500 may begin in block 501.

In block 501, telemetry service endpoint 406 receives requests for telemetry levels from telemetry producers 404. Each telemetry level request identifies the requesting telemetry producer 404. For each telemetry level request, telemetry service endpoint 406 retrieves a manifest 118 (FIG. 4) for the requesting telemetry producer 404 from manifest service 116 (FIG. 4) and returns the telemetry level in the manifest to the requesting telemetry producer 404.

In some examples, the telemetry level specifies the amount of telemetry data to be collected. Its value can be "FULL," "BASIC," or "OFF," and it is a suggestion to telemetry producers 404. When the telemetry level is set to "OFF," telemetry processing pipeline 407 does not process the telemetry service request from the requesting telemetry producer 404. Telemetry producers 404 with telemetry level set to "BASIC" should send the minimum data necessary to keep virtualized infrastructure 102 up-to-date and secure. Telemetry producers 404 with telemetry level set to "FULL" may send any telemetry data deemed useful by the product component stakeholders. Telemetry producers 404 then collect telemetry data from virtualized infrastructure 102, which may be based on their respective telemetry levels, and send the collected data in requests for telemetry service to telemetry service endpoint 406. In some examples, a telemetry producer 404 is a type of telemetry data collector 114 (FIG. 1) that is pre-programmed with what to collect but the level of the collection comes from its manifest 118. Alternatively, telemetry producer 404 may be the type of telemetry data collector 114 described above where both the telemetry data and the telemetry level are specified by its manifest 118. Block 501 may be followed by block 502.

In block 502, queue 408 (FIG. 4) receives telemetry service requests from telemetry producers 404 (FIG. 4) via telemetry service endpoint 406. The telemetry service requests are queued so that they may be processed asynchronously. Block 502 may be followed by block 504.

In block 504, telemetry level checker 410 (FIG. 4) fetches a telemetry service request from queue 408. The telemetry service request specifies the requesting telemetry producer 404. Telemetry level checker 410 retrieves a manifest 118 (FIG. 4) for the requesting telemetry producer 404 from manifest service 116 (FIG. 4), use the manifest previously retrieved by telemetry service endpoint 406 in block 501, or the manifest in cache 412. In some examples of the present disclosure, telemetry level checker 410 periodically retrieves all manifests 118 from manifest service 116 ahead of time and saves them in cache 412. Block 504 may be followed by block 506.

In block 506, telemetry level checker 410 determines if the customer has agreed to share telemetry data from virtualized infrastructure 102 (e.g., by looking up a customer database) and optionally the telemetry level is not set to "OFF." If so, block 506 may be followed by block 508. Otherwise method 500 may end.

In block 508, telemetry processor 414 (saves the collected data in the telemetry service request to telemetry log file 418 (FIG. 4) for the requesting telemetry producer 404. When telemetry log file 418 reaches a threshold size or a threshold time has passed, telemetry processor 414 saves further collected data to a new telemetry log file, compresses the old telemetry log file, and place the compressed telemetry log file in queue 420 for uploading to cloud analytics site 106. Block 508 may be followed by block 510.

In block 510, telemetry drainer executor 422 checks queue 420 for a batch of compressed telemetry log files and creates an instance of telemetry drainer 424 to drain the batch of compressed telemetry log files from queue 420 and pass it to telemetry filter 426. In some examples, telemetry drainer executor 422 checks queue 420 at random intervals to distribute the workload experienced by cloud analytics site 106. Block 510 may be followed by block 512.

In block 512, telemetry filter 426 filters the batch of compressed telemetry log files per the data filtering rules specified in manifest 118 for the requesting telemetry producer 404. Telemetry filter 426 may retrieve manifest 118 from manifest service 116, use the manifest previously retrieved by telemetry service endpoint 406 in block 501 or telemetry level checker 410 in block 504, or the manifest in cache 412. The filtering rules may specify a sampling rate or a down sampling of the collected data. Telemetry filter 426 passes the filtered batch of compressed telemetry log files to analytics cloud proxy 428. Block 512 may be followed by block 514.

In block 514, analytics cloud proxy 428 uploads the filtered batch of compressed telemetry log files to cloud analytics site 106 (more specifically data upload service 120 in FIG. 1). Block 514 may be followed by block 516. In block 516, analytics service 405 determines whether a failure occurs. If a failure occurs, block 516 may be followed by block 510 so that steps 510 to 514 are repeated until the filtered batch of compressed telemetry log files are successfully uploaded to cloud analytics site 106. Otherwise method 500 may end.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to enhance a virtualized infrastructure at a customer's premise with a cloud analytics service, the method comprising:
   receiving a request for an expert use case on an expertise about an object in the virtualized infrastructure, the request specifying the expertise and the object;

in response to the request for the expert use case, determining if the customer has agreed to share telemetry data from the virtualized infrastructure;
performing an expertise cycle to obtain an expertise result for the expert use case comprising:
at the customer's premise, retrieving a manifest for the expert use case from a cloud analytics site remote from the customer's premise, including specifying the expertise to the cloud analytics site, the manifest defining telemetry data types to be collected;
based on the manifest, collecting the telemetry data from the virtualized infrastructure;
uploading the collected telemetry data to the cloud analytics site, including specifying the expertise to the cloud analytics site; and
retrieving the expertise result for the expert use case from the cloud analytics site, the expertise result identifying the expertise, the object, and a timestamp of when the expertise result was generated;
communicating the expertise result about the object to the customer; and
after communicating the expertise result about the object to the customer, changing a configuration of the object based on the expertise result.

2. The method of claim 1, further comprising, prior to uploading the collected telemetry data to the cloud analytics site, anonymizing the telemetry data to protect confidential information included in the telemetry data.

3. The method of claim 1, wherein the changing the configuration of the object comprises (1) automatically changing the configuration of the object based on the expertise result or (2) communicating a recommendation for a change to the configuration of the object based on the expertise result and changing the configuration of the object after receiving a user command from the customer accepting the recommendation.

4. The method of claim 1, further comprising, prior to retrieving the manifest from the cloud analytics site, communicating a cached expertise result for the expert use case to the customer.

5. The method of claim 1, further comprising:
refreshing one or more cached expertise results by performing the expertise cycle for the one or more cached expertise results; and
communicating one or more refreshed expert results to the customer.

6. The method of claim 1, further comprising, prior to retrieving the manifest, storing the request in a queue and retrieving the request from the queue for processing.

7. The method of claim 1, further comprising determining a telemetry level from the manifest, wherein collecting the telemetry data from the virtualized infrastructure comprises collecting an amount of the telemetry data based on the telemetry level.

8. The method of claim 1, wherein uploading the collected telemetry data to the cloud analytics site comprises:
logging a first portion of the collected telemetry data to a first telemetry log file;
when the first telemetry log file reaches a threshold size or a threshold time has passed:
logging a second portion of the collected telemetry data to a second telemetry log file; and
compressing the first telemetry log file and storing the compressed first telemetry log files in a queue.

9. The method of claim 8, wherein uploading the collected telemetry data to the cloud analytics site further comprises, following a random time interval:

retrieving the compressed first telemetry log file from the queue; and
providing a batch of compressed telemetry log files, including the compressed first telemetry log file, for uploading to the cloud analytics site.

10. The method of claim 9, wherein uploading the collected telemetry data to the cloud analytics site further comprises:
determining a filtering rule from the manifest; and
filtering the compressed first telemetry log file according to the filtering rule.

11. A non-transitory, computer-readable storage medium encoded with instructions executable by a processor to enhance a virtualized infrastructure at a customer's premise with a cloud analytics service, the instructions comprising:
receiving a request for an expert use case on an expertise about an object in the virtualized infrastructure, the request specifying the expertise and the object;
in response to the request for the expert use case, determining if the customer has agreed to share telemetry data from the virtualized infrastructure;
performing an expertise cycle to obtain an expertise result for the expert use case comprising:
at the customer's premise, retrieving a manifest for the expert use case from a cloud analytics site remote from the customer's premise, including specifying the expertise to the cloud analytics site, the manifest defining telemetry data types to be collected;
based on the manifest, collecting the telemetry data from the virtualized infrastructure;
uploading the collected telemetry data to the cloud analytics site, including specifying the expertise to the cloud analytics site; and
retrieving the expertise result for the expert use case from the cloud analytics site, the expertise result identifying the expertise, the object, and a timestamp of when the expertise result was generated;
communicating the expertise result about the object to the customer; and
after communicating the expertise result about the object to the customer, changing a configuration of the object based on the expertise result.

12. The computer-readable storage medium of claim 11, wherein the instructions further comprise, prior to uploading the collected telemetry data to the cloud analytics site, anonymizing the telemetry data to protect confidential information included in the telemetry data.

13. The computer-readable storage medium of claim 11, wherein the changing the configuration of the object comprises (1) automatically changing the configuration of the object based on the expertise result or (2) communicating a recommendation for a change to the configuration of the object based on the expertise result and changing the configuration of the object after receiving a user command from the customer accepting the recommendation.

14. The computer-readable storage medium of claim 11, wherein the instructions further comprise communicating a cached expertise result for the expert use case to the customer.

15. The computer-readable storage medium of claim 11, wherein the instructions further comprise:
refreshing one or more cached expertise results by performing the expertise cycle for the one or more cached expertise results; and
communicating one or more refreshed expert results to the customer.

16. The computer-readable storage medium of claim 11, wherein the instructions further comprise, prior to retrieving the manifest, storing the request in a queue and retrieving the request from the queue for processing.

17. The computer-readable storage medium of claim 11, wherein the instructions further comprise determining a telemetry level from the manifest, wherein collecting the telemetry data from the virtualized infrastructure comprises collecting an amount of the telemetry data based on the telemetry level.

18. The computer-readable storage medium of claim 11, wherein uploading the collected telemetry data to the cloud analytics site comprises:
   logging a first portion of the collected telemetry data to a first telemetry log file;
   when the first telemetry log file reaches a threshold size or a threshold time has passed:
      logging a second portion of the collected telemetry data to a second telemetry log file; and
      compressing the first telemetry log file and storing the compressed first telemetry log files in a queue.

19. The computer-readable storage medium of claim 18, wherein uploading the collected telemetry data to the cloud analytics site further comprises, following a random time interval:
   retrieving the compressed first telemetry log file from the queue; and
   providing a batch of compressed telemetry log files, including the compressed first telemetry log file, for uploading to the cloud analytics site.

20. The computer-readable storage medium of claim 19, wherein uploading the collected telemetry data to the cloud analytics site further comprises:
   determining a filtering rule from the manifest; and
   filtering the compressed first telemetry log file according to the filtering rule.

21. A system, comprising:
   computers configured to implement a virtualized infrastructure at a customer's premise; and
   a non-transitory, computer-readable storage medium encoded with instructions that, when executable by the computers, cause the computers to:
      receive a request for an expert use case on an expertise about an object in the virtualized infrastructure, the request specifying the expertise and the object;
      in response to the request for the expert use case, determining if the customer has agreed to share telemetry data from the virtualized infrastructure;
      perform an expertise cycle to obtain an expertise result for the expert use case;
      receive the expertise result for the expert use case, the expertise result identifying the expertise, the object, and a timestamp of when the expertise result was generated;
      communicate the expertise result about the object to the customer;
      collect the telemetry data;
      receive the collected telemetry data, the collected telemetry data specifying the expertise;
      upload the collected telemetry data to the cloud analytics site, including specifying the expertise;
      retrieve the expertise result for the expert use case from the cloud analytics site;
      provide the expertise result for the expert use case;
      at the customer's premise, retrieve a manifest for the expert use case from the cloud analytics site, including specifying the expertise and the object to the cloud analytics site, the manifest specifying the telemetry data to be collected;
      based on the manifest, collect the telemetry data from a software product; and
      provide the collected telemetry data.

22. The system of claim 21, further comprising a scheduler configured to periodically instruct the computers to refresh one or more cached expertise results by performing the expertise cycle for the one or more cached expertise results.

* * * * *